Dec. 4, 1945.    N. GEERTSEN    2,390,094
CONTAINER
Filed July 28, 1943
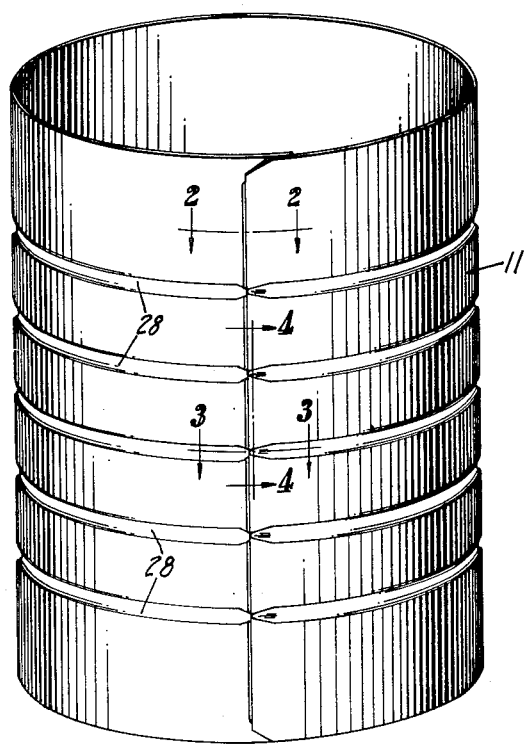
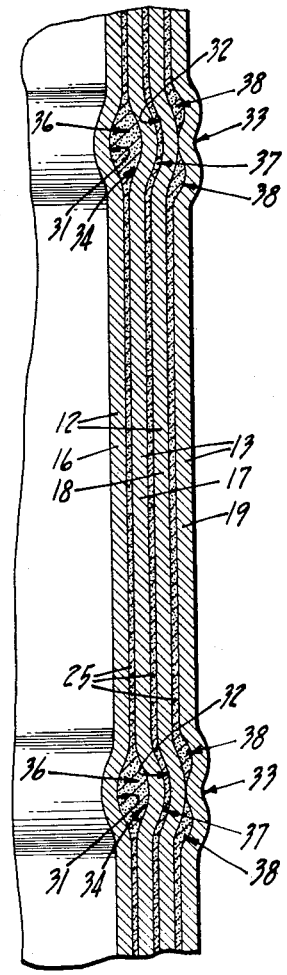
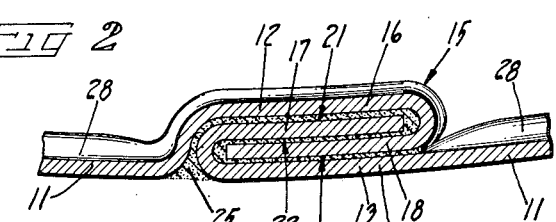
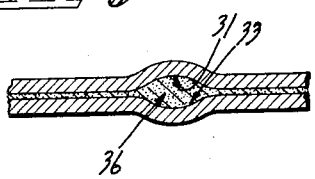
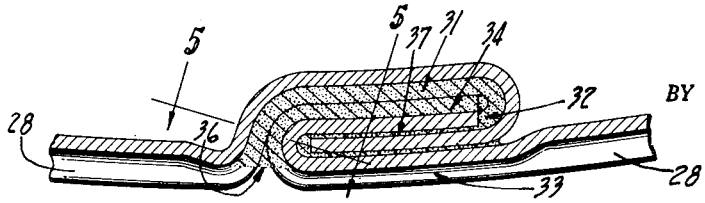
INVENTOR.
Nelson Geertsen
BY Ivan D. Thornburgh
Charles H. Erne
ATTORNEYS Patented Dec. 4, 1945

2,390,094

UNITED STATES PATENT OFFICE 2,390,094

CONTAINER

Nelson Geertsen, Chicago, Ill., assignor to American Can Company, New York, N. Y., a corporation of New Jersey Application July 28, 1943, Serial No. 496,489

2 Claims. (Cl. 220—81)

The present invention relates to sheet metal containers or cans and has particular reference to reenforcing can bodies with beads which extend into the side seam of the body and form vent channels for venting the side seam when it is subsequently soldered.

In the packaging of certain products for shipment over long distances where weight is an important factor it has been found desirable to manufacture sheet metal cans from plate (tin plate and black iron plate) of reduced thickness so that the finished can will be considerably lighter than is usual practice. The use of such reduced thickness plate for the manufacture of cans is designed to save metal in cooperation with the war effort.

However, cans made from light weight sheet metal are greatly reduced in body strength and where the usual lock and lap soldered side seams are used the strength and resistance to separation or opening of the folds of the seam are inadequate. Thus the usual internal pressure or vacuum in a can or the rough external handling sometimes given cans during shipment and storage may easily cause rupture of the side seam or collapse of the body and thereby result in failure of the can.

The instant invention contemplates overcoming these difficulties by reenforcing the lightweight material can by the use of one or more reenforcing beads formed in the body to strengthen it with the beads modified in manufacture extending into the side seam to strengthen the seam by setting off vent channels therein so that sufficient solder may be introduced properly into the seam, not only to strengthen the seam by the presence of the solder, but also to insure more positive bonding together of the interfolded layers of the seam.

An object therefore of the invention is the provision of a light weight sheet metal can body having opposed marginal hook edges interlocked in a side seam made up with the conventional plurality of layers, wherein the body is strengthened by reenforcing beads which extend into the hook edges of the body to strengthen the seam and also to set off circuitous vent channels for venting the side seam so that sufficient solder will enter the seam and be distributed properly during a subsequent soldering operation, whereby the seam is reenforced and whereby there is insured a positive and complete bonding together of the layers of the seam.

Another object is the provision of such a can body wherein the reenforcing beads extend around the body and project from one surface thereof, and as flattened beads extending into and across the interlocked hook edges of the side seam, thereby forming in the seam oppositely disposed trough shaped projections on adjacent surfaces of the hook edges, the trough shaped projections on one hook edge being disposed in registry with the projections on the other hook edge and setting off circuitous vent channels completely through the layers of the seam.

Numerous other objects and advantages of the invention will be apparent as it is better understood from the following description, which, taken in connection with the accompanying drawing, discloses a preferred embodiment thereof.

Referring to the drawing:

Figure 1 is a perspective view of a can body embodying the instant invention;

Figs. 2 and 3 are enlarged detail sectional views taken across the side seam of the body, substantially along the respective lines 2—2 and 3—3 in Fig. 1;

Fig. 4 is an enlarged sectional view taken along the side seam substantially along the line 4—4 in Fig. 1; and Fig. 5 is a sectional detail taken substantially along the line 5—5 in Fig. 3.

As a preferred embodiment of the instant invention the drawing illustrates a tubular, light weight, sheet metal can body 11 (Fig. 1) having its opposite side seam edges formed with reversely bent inside and outside hook edges 12, 13 (Fig. 2) which are interlocked along a major portion of the edges in the usual manner. This produces a locked side seam 15 having a plurality of layers 16, 17, 18, 19 of metal with spaces 21, 22, 23 therebetween. Layers 16, 18 form parts of the inside hook edge while layers 17, 19 are parts of the outside hook edge. The hooked edges are interengaged and are finally bumped in the usual manner. These layers of interhooked metal are bonded together by solder 25 which is forced into the spaces of the seam from the exterior of the can body according to standard can making practices.

In order to provide rigidity and strength against collapse, the light weight body is formed with a plurality of annular reenforcing beads 28 which are pressed in the metal of the body. The drawing shows five of these beads although any number may be used in accordance with the sizes of cans and the ultimate packaging requirements of the can of which the body will form a part. The drawings also show these beads projecting inwardly although the invention is equally well adapted to outside beads if such beads are desired.

The beads 28 preferably extend entirely around the can body and their opposite ends enter and terminate in the side seam. In the seam the beads extend across the hook edges 11, 12 and around the bends in the hooks to the terminal edges of the hooks. These hook portions of the beads in the seam, however, are considerably flatter than the remaining bead portions in the body, said flattening being brought about by the usual bumping of the hooks to produce the seam. However, according to the present invention enough of the bead configuration remains in the hooks after the bumping operation to form shallow troughs 31, 32 in the inside hook and similar troughs 33, 34 in the outside hook.

The troughs 31, 34 on adjacent surfaces of the layer 16 of the inside hook 12 and on the layer 17 of the outside hook 13 are in parallel registry with each other and set off a vent opening 36 (see Figs. 3, 4 and 5) which extends from the outside of the body to the interior of the side seam. The trough 32 aligns with the back of the trough 34 on adjacent surfaces of the layer 18 of the inside hook 12 and on the layer 17 of the outside hook 13 and this nested relation sets off a vent opening 37 between the layers. This opening 37 communicates with the vent opening 36 as best shown in Fig. 3.

The respective rear wall surfaces of the trough projections 32, 33 are disposed in abutting relation on adjacent surfaces of the layer 18 of the inside hook 12 and of the layer 19 of the outside hook 13. It will be observed by reference to Fig. 4 that the outside layer wall 19 on both sides of the trough 33 is also slightly wrinkled. This is the result of the bumping operation and the double bend thus produced sets off a pair of parallel vent openings 38 between the layers. These vent openings 38 communicate with the vent opening 37 and thus lead into the inside of the body.

With this train of vent openings 36, 37, 38 disposed in the seam as a continuation of each of the body reenforcing beads 28, a plurality of circuitous vent channels are provided in the side seam. These channels permit of the escape of air from the seam into the interior of the can body when the solder in a fluid condition is applied to the seam from the exterior of the body. The escape of the trapped air permits of the introduction into the seam of the proper amount of solder as well as the proper placing or complete dispersion of the solder throughout the seam, and this in turn strengthens the seam to such an extent that in lightweight reenforced bodies the interlocked hook edges of the seam are reenforced against partial opening due to pressure or handling, as hereinbefore mentioned.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A soldered reenforced sheet metal can body, comprising a tubular body wall, a side seam extending longitudinally of said body wall and including interlocked marginal inside and outside hooked edges of said wall arranged as a plurality of layers of metal within the seam, a continuous reenforcing surrounding annular bead formed in said body wall to form a trough therein, said bead adjacent said side seam merging into connecting flattened bead sections in the hooks of said wall and forming shallow troughs on both sections of the inside hook and communicating shallow troughs in both sections of the outside hook, said shallow troughs communicating with said first mentioned trough and setting off a continuous circuitous vent opening through the seam transversely thereof from the outside to the inside of the can body for venting the seam during a soldering operation, and solder filling said openings.

2. A soldered reenforced sheet metal can body, comprising a tubular body wall, a side seam extending longitudinally of said body wall and including interlocked marginal hooked edges of said wall arranged as a plurality of layers of metal within the seam, a plurality of spaced continuous reenforcing annular beads formed in and surrounding said body wall, said beads extending across and around the bends of said hooks and terminating at the edges of said body wall to provide a plurality of spaced continuous vent openings transversely through said seam for venting the seam during soldering thereof, each of said beads within said seam setting off a pair of partially flattened oppositely disposed curved wall sections disposed in two adjacent layers of said interlocked seam, a flattened curved wall section in an intermediate layer of said seam disposed in spaced nested relation to one of said first mentioned curved wall sections, and a partially flattened double bend wall section disposed in another layer of said interlocked seam, and solder filling said vent openings and the spaces between the layers of metal of the seam.

NELSON GEERTSEN.